(12) United States Patent
Boucher

(10) Patent No.: US 10,596,849 B2
(45) Date of Patent: Mar. 24, 2020

(54) WHEEL RIM PROTECTOR

(71) Applicant: Eric Boucher, Ste-Agathe-des-Monts (CA)

(72) Inventor: Eric Boucher, Ste-Agathe-des-Monts (CA)

(73) Assignee: Eric Boucher, Sainte-Agathe-des-Monts, Québec (CA)

(*) Notice: Subject to any disclaimer, the term of this patent is extended or adjusted under 35 U.S.C. 154(b) by 0 days.

(21) Appl. No.: 15/731,621

(22) PCT Filed: Jan. 15, 2016

(86) PCT No.: PCT/CA2016/000011
§ 371 (c)(1),
(2) Date: Jul. 10, 2017

(87) PCT Pub. No.: WO2016/112457
PCT Pub. Date: Jul. 21, 2016

(65) Prior Publication Data
US 2018/0050560 A1 Feb. 22, 2018

Related U.S. Application Data

(60) Provisional application No. 62/103,623, filed on Jan. 15, 2015.

(51) Int. Cl.
*B60B 7/01* (2006.01)
*B05B 15/00* (2018.01)
*B60B 7/04* (2006.01)

(52) U.S. Cl.
CPC .............. *B60B 7/01* (2013.01); *B05B 15/00* (2013.01); *B60B 7/04* (2013.01)

(58) Field of Classification Search
CPC ....... B05B 15/0487; B05B 15/00; B60B 7/01; B60B 7/04
See application file for complete search history.

(56) References Cited

U.S. PATENT DOCUMENTS

| | | | | |
|---|---|---|---|---|
| 4,874,206 A | * | 10/1989 | Sampson | B60B 7/00 301/37.103 |
| 5,524,972 A | * | 6/1996 | Cailor | B05B 12/30 301/37.42 |
| 6,425,639 B1 | * | 7/2002 | Getzelman | B05B 12/30 301/37.103 |
| 6,485,106 B1 | * | 11/2002 | Hermansen | B60B 7/0066 301/37.103 |

(Continued)

FOREIGN PATENT DOCUMENTS

WO WO2008092185 A1 * 8/2008 ............... B60B 7/04

*Primary Examiner* — Jason R Bellinger

(57) ABSTRACT

This is a cover acting as a solid space of protection to protect the embellished surface of a wheel rim when installing a tire on it. The cover includes a circular structure designed in such way as to be held detachably on a wheel rim, the circular structure being made of two semi-annular sub-structures connected by at least one resilient element bringing the two sub-structures towards each other, a fastening system with motion limiting device, an inwardly curved circular contour and handles fixed to the circular structure for its handling. The elements are configured in order to fasten the circular structure and to be held detachably in an adjustable manner on a wheel rim.

11 Claims, 5 Drawing Sheets

(56) References Cited

U.S. PATENT DOCUMENTS

| | | | | |
|---|---|---|---|---|
| 6,905,177 B1* | 6/2005 | Murillo | ............... | B60B 7/0066 |
| | | | | 118/504 |
| 7,448,694 B1* | 11/2008 | Bentley | ................... | B60B 7/04 |
| | | | | 118/504 |
| 8,496,300 B2* | 7/2013 | Nebel | ..................... | B60B 7/02 |
| | | | | 301/37.103 |
| 2007/0290548 A1* | 12/2007 | Lundy | ..................... | B60B 7/01 |
| | | | | 301/37.24 |
| 2012/0274125 A1* | 11/2012 | Waldt | ................... | B05B 12/30 |
| | | | | 301/37.106 |
| 2016/0101647 A1* | 4/2016 | Colvin | ................... | B60B 7/04 |
| | | | | 301/37.103 |

* cited by examiner

(12) United States Patent

WHEEL RIM PROTECTOR

CROSS REFERENCE TO RELATED APPLICATIONS

The present application is a U.S. National Stage of International Application No. PCT/CA2016/000011 filed on Jan. 15, 2016 which claims the benefit of U.S. Application 62/103,623 filed Jan. 15, 2015.

FIELD OF THE INVENTION

The present invention relates a protective cover aimed at protecting an embellished part of an automobile wheel rim, or more precisely, a protective cover attached to the wheel rim embellished surface, part of a wheel rim which is obviously an element to be protected.

DESCRIPTION OF PRIOR ART

Nowadays, the automotive market includes wheel rims made of metal alloys, of small, medium and greater value. These wheel rims are all provided with an embellished surface, but with a relatively fragile finish. When mounting or dismounting a tire on these wheel rims, physical damage can arise to the embellished part of these rims. The most effective way to avoid such damage would be to offer a workshop tool able to cover the entire embellished surface. An objective of these present invention is to provide a tool used in auto shops and other specialized workshops. The tool may be used when mounting or dismounting a tire on a wheel rim. The tool could be used as a solid gap of protection in order to protect the wheel rim embellished surface against physical damage caused by an outside impact when mounting or dismounting a tire.

PRIOR ART DESCRIPTION

In this field, several workshop equipment manufacturers have developed very sophisticated equipment in order among other things, to install or remove a tire on a wheel rim, firstly, without those certain parts of the unit coming into contact with a wheel rim, and secondly, by making plastic tips which are installed on the portions most at risk of coming into contact with the wheel rim.

OBSTACLES ENCOUNTERED OVER TIME

1) The cost of equipment. Equipment unit available on the market are very good, however, the high cost of these units results in several merchants, managers or workshop directors being reluctant to purchase these types of equipment units and looking for an alternative solution, or using old units that provide little or no protection to the wheel rims.

2) Maintenance. Manufacturers sometimes offer free maintenance service for a limited period of time. Once this period expires, the tire changer machine maintenance is the responsibility of the owner. He must ensure the cleanliness, lubrication, and replacement of worn parts to keep the unit in the best possible condition. With time and neglect, some parts of the tire changer machine can bend, wear out, and/or become problematic, which has the effect that the unit becomes ineffective to ensure a mounting/dismounting of a tire without contact. Sometimes, physical damage with the embellished part of a wheel rim results from this.

3) The quality of work performed. The qualification of the person handling the workshop equipment, who in general has all the necessary qualities to perform the task, can not always be up to par. however can sometimes lack focus which may result in physical damage to the embellished part of a wheel rim.

Equipment that is performant and efficient today is complex, very costly and does not protect the wheel at 100%.

SUMMARY OF THE INVENTION

An objective of the invention is to provide a simple easy to use design that is effective and inexpensive.

The present invention provides a tool installable on a wheel rim surface for a protection of said wheel rim surface, the tool comprising:

a circular structure formed so as to be held removably on said wheel rim, the circular structure comprising a contour curved inwardly. Once installed on the wheel rim, the tool acts as a solid gap of protection so that the tire changer machine cannot come into contact with the wheel rim. By avoiding the risk of damage to the wheel rim, this minimizes customer complaints, avoid damage-related fees including indemnities, reimbursements, cost absorptions and loss of profits.

The systems on the market known to the Applicant used to protect the embellished surface of a wheel rim from physical damage when mounting or dismounting a tire, leaves nevertheless a completely exposed wheel rim on the tire changer machine. One of the objects of the present invention is to protect the wheel rim embellished surface by covering it with a solid gap of protection thus offering maximum protection.

DESCRIPTION OF THE FIGURES

In the drawings which illustrate the invention.

DETAILED DESCRIPTION

The invention relates to a wheel rim embellished surface protection tool. Said tool is characterized in that it consists of a circular structure having an inner side, an outer side, made of a material selected from the group comprising plastics, polymers, or other composite materials. The surface of said circular structure is slightly convex, has a peripheral <<J>> shaped contour curved inwardly, said peripheral <<J>> shaped contour allows said tool to properly fix onto said wheel rim. Said tool once installed on said wheel rim is intended to protect the embellished surface to that said wheel rim in a simple and very effective manner.

As illustrated in FIGS. 1 to 5, the present invention provides a tool 10 mountable on the surface of a wheel rim (not illustrated) for the protection of said wheel rim. The tool comprises a circular structure 12 shaped to be detachably mounted on the wheel rim, the circular structure comprising a circular outline 14 curved inwardly.

Figure 1:
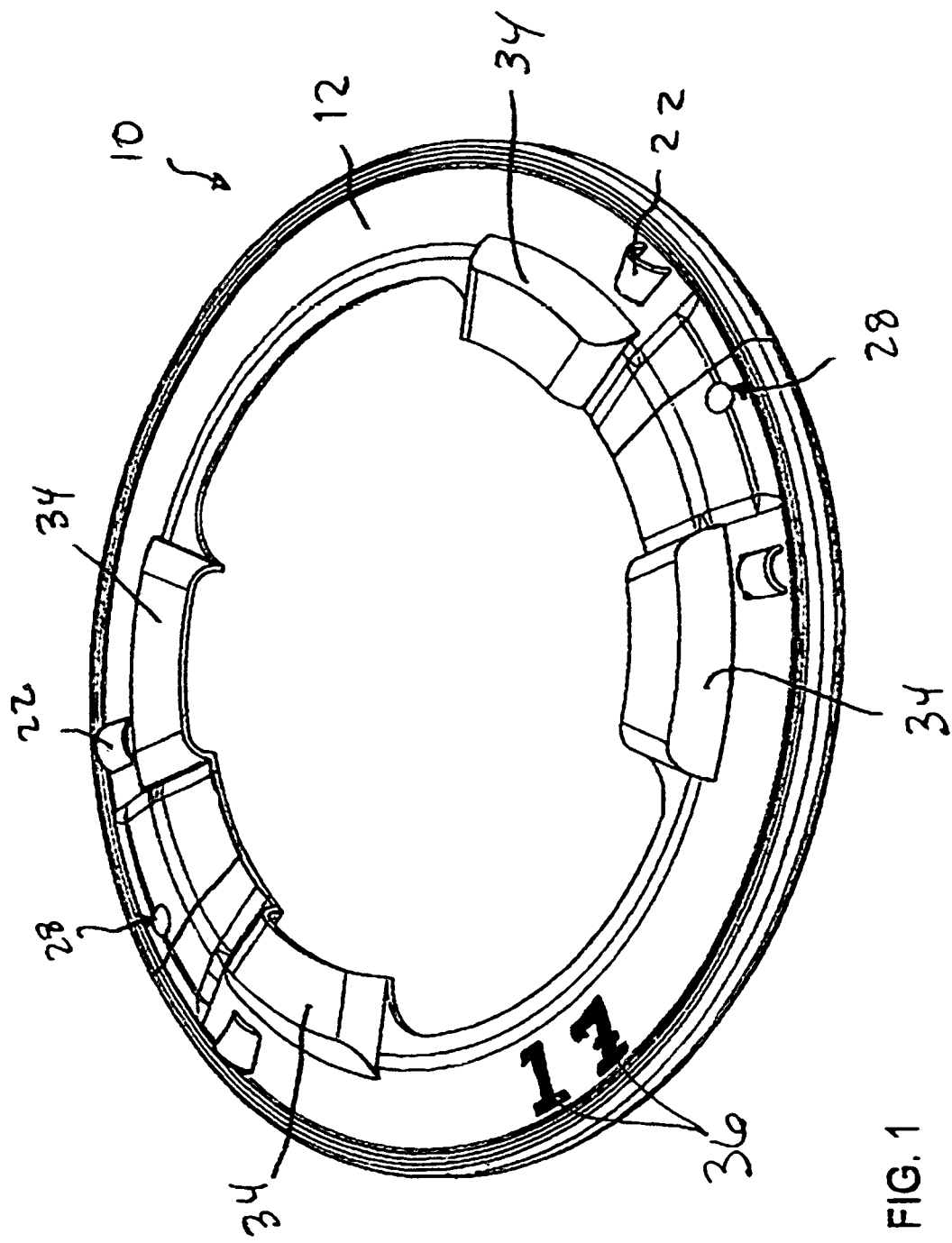
FIG. 1 is a perspective view of the tool according to a preferred embodiment of the present invention.
Figure 2:
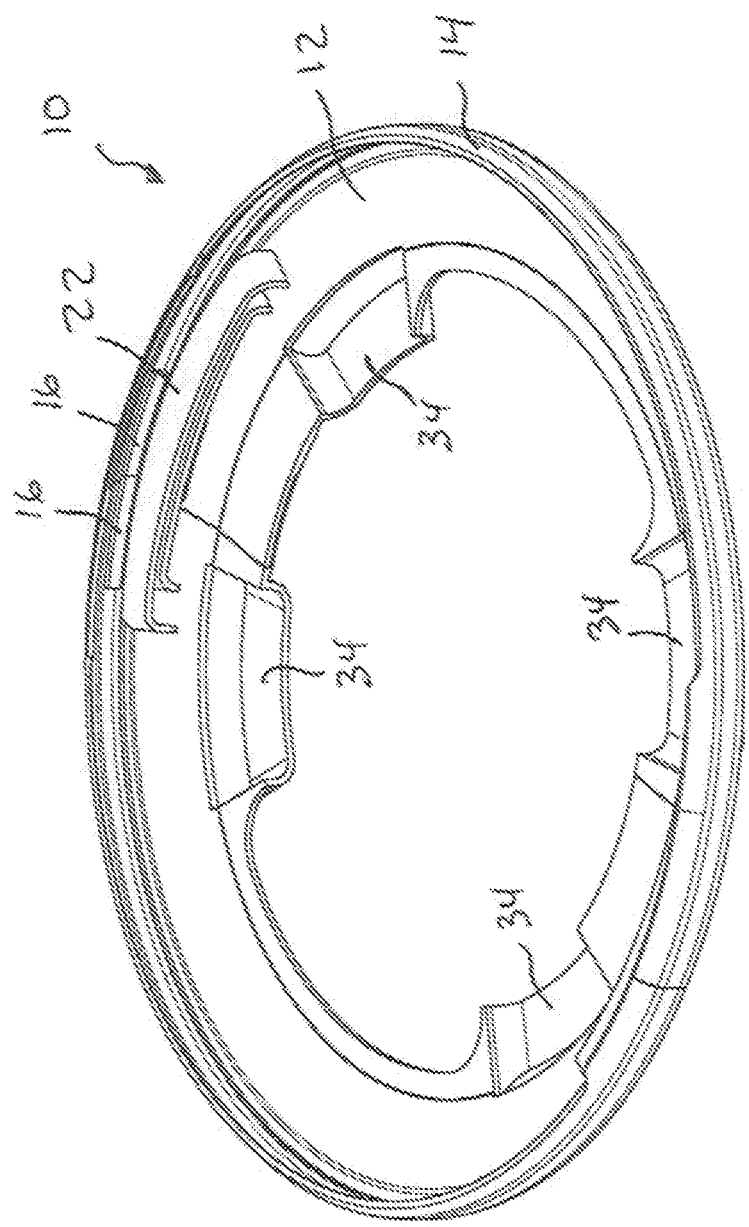
FIG. 2 is an inner side view of the tool of FIG. 1.
Figure 3:
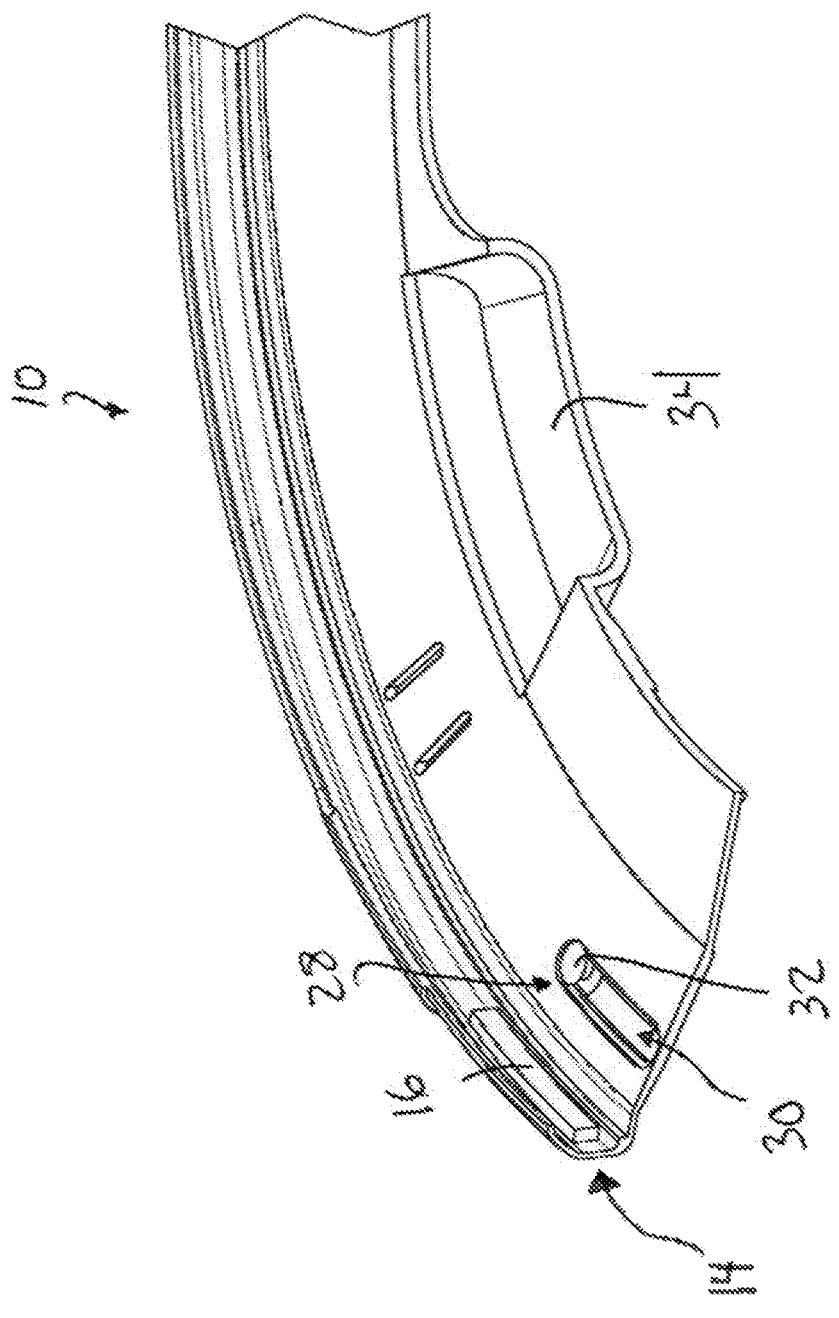
FIG. 3 is a detailed view of the tool of FIG. 1.
Figure 4:
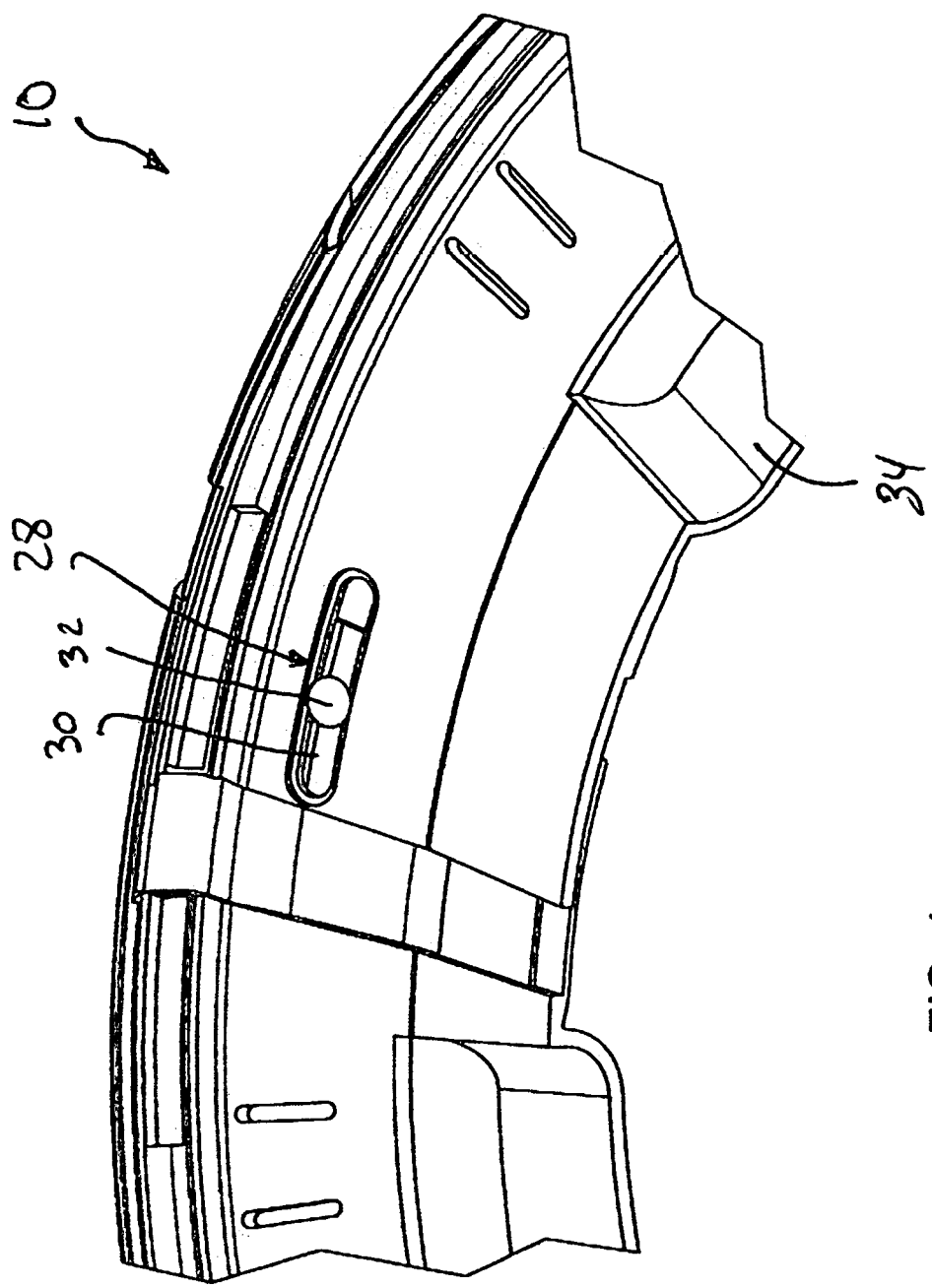
FIG. 4 is another detailed view of the tool of FIG. 1.
Figure 5:
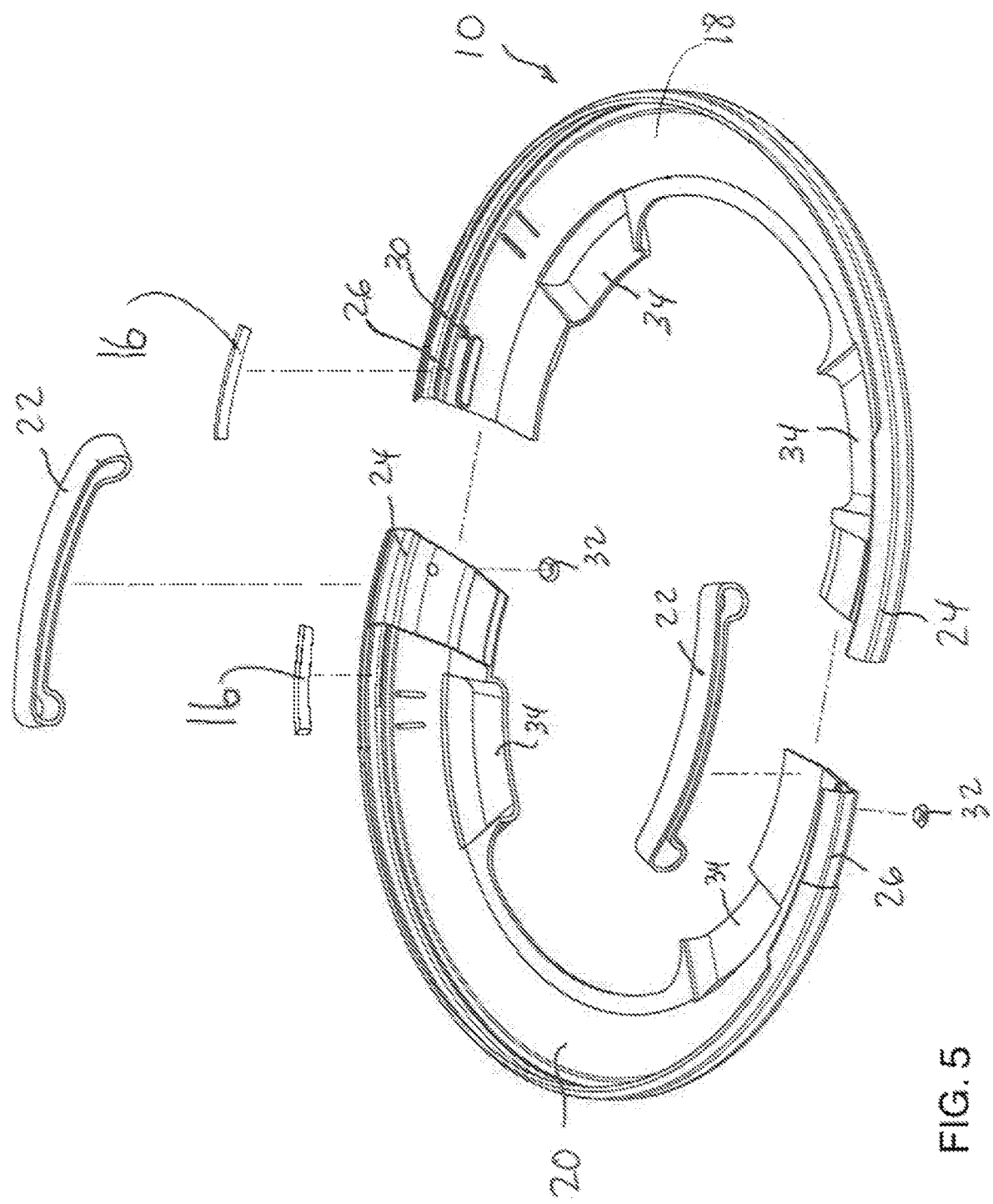
FIG. 5 is an exploded view of the components of the tool of FIG. 1.

According to a preferred embodiment, the inwardly curved circular contour 14 is generally J-shaped as shown the cross-sectional view of the circular structure on FIG. 3

According to a preferred embodiment, the tool 10 further comprises at least one slippage prevention strip 16 fixed on an inner side of the circular structure 12.

According to a preferred embodiment, the circular structure 12 comprises two semi-annular substructures 18,20 connected by at least one resilient member 22 urging the two substructures 18,20 to move towards one another, said semi-annular substructures 18,20 being detachably mounted and adjustably held on variable wheel rim sizes.

According to a preferred embodiment, the resilient member 22 is made of an elastic material.

According to a preferred embodiment, each semi-annular substructure 18, 20 comprises a male end 26 and a female end 24, said male end 26 of a first one of the semi-annular substructures being formed for insertion into the corresponding female end 24 of a second one of the semi-annular substructures.

According to a preferred embodiment, each semi-annular 18,20 substructure is made from the same mould.

According to a preferred embodiment, the tool 10 includes at least one motion limiting device 28 for limiting the relative movement between the two semi-annular substructures.

According to a preferred embodiment, the motion limiter 28 includes a slot assembly 30 and rivet 32, said rivet 32 being slidable within said slot assembly 30.

According to a preferred embodiment, the tool 10 further comprises at least one handle 34 fixed to the circular structure 12 for the handling of said circular structure 12.

According to a preferred embodiment, the tool 10 further comprises a damage prevention coating installed on an external surface of the circular structure.

According to a preferred embodiment, the circular structure 12 is made of a material selected from the group comprising plastics, bioplastics, polymers, biopolymers, elastomer, resin material, and composite materials.

According to a preferred embodiment, the circular structure 12 comprises at least damage prevention coating 11 installed on the inner surface of the circular structure 12 said damage prevention coating 11 is present in case where the inner side of the circular structure 12 come into contact with the part of wheel to be protected.

According to a preferred embodiment, tool 10 further comprises a visual indicator 36 on the circular structure, said visual indicator 36 being indicative of a wheel rim diameter with which said tool will be use.

According to a preferred embodiment, the visual indicator 36 is an engraving.

According to another preferred embodiment, the protective tool is formed from a circular structure having an inner side and an outer side. The outer surface of said circular structure is formed of two elements. A plane surface of about 40 mm in width has an outer end curved in a <<J>> shape which is radially arranged forming a periphery with a slightly convex central surface. On this radially positioned plane surface, a 30 mm diameter hole is placed proximate the <<J>> shaped contour surface. A straight line cut is made at the height of this 30 mm hole. This cut finds its start point at the tip of the bent portion of the peripheral contour and is directed towards the center of the circular structure, passes through the 30 mm hole and finds its stop point about 30 mm from the 30 mm hole. The circular element having an overall circumference adjusted to a wheel rim size to be protected and is an approximately 5 mm thick structure. The inner portion of the bent peripheral contour is provided with a about 30 mm wide and 5 mm thick slippage prevention strip extending radially over the entire inner surface of the bent peripheral contour. Finally, a foam-type membrane of about 5 mm in thickness is applied to an inner surface of the circular structure.

According to another preferred embodiment, a rear portion of the convex surface of the circular structure and an inner portion of the bent peripheral contour are covered with a foam-type membrane having a thickness of about 5 mm.

According to another embodiment of the invention, the circular structure having an outer and inner side has a generally planar surface and a contour.

According to another preferred embodiment, the tool is generally a circular structure with a convex surface and <<J>> shaped periphery contour bent inwardly to enable it to hang on the wheel rim.

According to another preferred embodiment, a circular orifice is positioned on the <<J>> shaped peripheral surface. This is a clearance area in order to provide access to an inflation valve (not illustrated) that is generally present on the wheel rim when mounting or dismounting a tire. A cut is provided allowing the parts to be separated before and after the orifice, and this separation will make it easier to install the tool on the wheel rim.

According to another preferred embodiment, a circular orifice is placed in the center of the circular structure. This is a clearance area in cases where a mounting apparatus would be provided with an axial structure passing through the hole in the center of the wheel rim and this axial structure would therefore pass through the circular structure center orifice. According to a preferred embodiment, the back of the tool 10 can comprise a well-visible foam-type coating.

This coating is designed to provide maximum protection of the wheel rim embellished surface in case of contact with said tool, and the inner side of the peripheral <<J>> shaped contour has a slippage prevention coating.

The invention claimed is:

1. A tool installable on the surface of a wheel rim to protect said rim, the tool comprising: a circular structure formed so as to be held removably on said wheel rim, the structure comprising an inwardly curved circular contour, wherein the circular structure comprises: two semi-annular substructures connected by at least one resilient element bringing the two substructures towards each other, said semi-annular substructures being held detachably in an adjustable manner said wheel rim, wherein a cross-section of the contour is generally "J"-shaped.

2. The tool according to claim 1, further comprising at least one slippage prevention assembly fixed on to an inner side of the circular structure.

3. The tool according to claim 1, wherein the resilient member comprises an elastic material.

4. The tool according to claim 1, wherein each semi-annular substructure comprises a male end and a female end, said male end of a first of the semi-annular substructures being shaped for insertion in a corresponding female end of a second of the semi-annular substructures.

5. The tool according to claim 1, wherein each semi-annular substructure is manufactured from a same mould.

6. The tool according to claim 1, comprising at least one motion limiter device for limiting relative movement between the two semi-annular substructures.

7. The tool according to claim 6, wherein the motion limiter comprises an assembly of a slot and rivet, said rivet being slidable within said slot.

8. The tool according to claim 1, further comprising at least one handle attached to the circular structure for handling said circular structure.

9. The tool according to claim 1, wherein the circular structure is made of a material selected from the group comprising plastics, bioplastics, polymers, biopolymers, resinous materials, metals and composite materials.

10. The tool according to claim 1, further comprising a visual indicator on the circular structure, said visual indicator being indicative of a diameter of the wheel rim to be used with said tool.

11. The tool according to claim 1, wherein the circular structure further comprises a slippage prevention material installed on an inner surface of the circular structure.

* * * * *